United States Patent [19]
Fukawa et al.

[11] Patent Number: 5,757,844
[45] Date of Patent: May 26, 1998

[54] SPREAD SPECTRUM RECEIVER

[75] Inventors: Kazuhiko Fukawa; Hiroshi Suzuki, both of Yokohama, Japan

[73] Assignee: NTT Mobile Communications Network Inc, Tokyo, Japan

[21] Appl. No.: 411,682

[22] PCT Filed: Oct. 12, 1994

[86] PCT No.: PCT/JP94/01702

§ 371 Date: Jul. 18, 1995

§ 102(e) Date: Jul. 18, 1995

[87] PCT Pub. No.: WO95/10892

PCT Pub. Date: Apr. 20, 1995

[30] Foreign Application Priority Data

Oct. 13, 1993 [JP] Japan .................. 5-255990
Oct. 14, 1993 [JP] Japan .................. 5-257202
Oct. 14, 1993 [JP] Japan .................. 5-257211

[51] Int. Cl.$^6$ .................................. H04K 1/00
[52] U.S. Cl. .................................. 375/200; 35/202
[58] Field of Search ..................... 375/200, 206, 375/208, 267, 347, 205, 285, 346, 202, 232, 233; 364/724.19, 724.2

[56] References Cited

U.S. PATENT DOCUMENTS

| | | | |
|---|---|---|---|
| 5,305,349 | 4/1994 | Dent | 375/205 |
| 5,349,609 | 9/1994 | Tsujimoto | 375/347 |
| 5,504,783 | 4/1996 | Tomisato et al. | 375/347 |

FOREIGN PATENT DOCUMENTS 5-292063  11/1993  Japan .
6-141021   5/1994  Japan .

OTHER PUBLICATIONS

Higashi, Akihiro and Matsumoto, Tadashi, IEEE Journal on Selected Areas in Communications, vol. 11, No. 7, Sep. 1993, pp. 1076–1084.

Tomisato, Shigeru, Fukawa, Kazuhiko and Suzuki, Hiroshi, Technical Report of IEICE, Jan. 1993, pp. 61–66.

Tomisato, Shigeru, Fukawa, Kazuhiko and Suzuki, Hiroshi, Technical Report of IEICE, Jun. 1993, pp. 7–12.

Fukawa, Kazuhiko and Suzuki, Hiroshi, Technical Report of IEICE, Jul. 1989, pp. 415–421.

Qiu, Zhong-Qi, USUI, Shiro and Abe, Kenichi, Technical Report of IEICE, Jul. 1989, pp. 1038–1044.

Yoon, Young C., Kohno, Ryuji and Imai, Hideki, IEEE Second International Symposium on Spread Spectrum Techniques and Applications, Nov./Dec. 1992, pp. 87–90.

*Primary Examiner*—Tesfaldet Bocure
*Attorney, Agent, or Firm*—Cushman Darby & Cushman IP Group of Pillsbury Madison & Sutro LLP

[57] ABSTRACT

Good bit error performance is necessary in a spread spectrum receiver even when there is severe fast varying fading fluctuation. To achieve this, the received signal is despread and outputted as a plurality of despread signals. Signal decision is performed on the basis of the result of linear combination of the despread signals. Alternatively, a priori estimation errors are calculated by subtracting, for each despread signal, an estimated despread signal from the despread signal, and signal decision is performed on the basis of the sum of the squares of these a priori estimation errors for each despread signal. Tap coefficients are estimated by employing an RLS algorithm in which the a priori tap coefficient vector is replaced with the result of multiplying the a priori tap coefficient vector by a transition matrix.

14 Claims, 11 Drawing Sheets

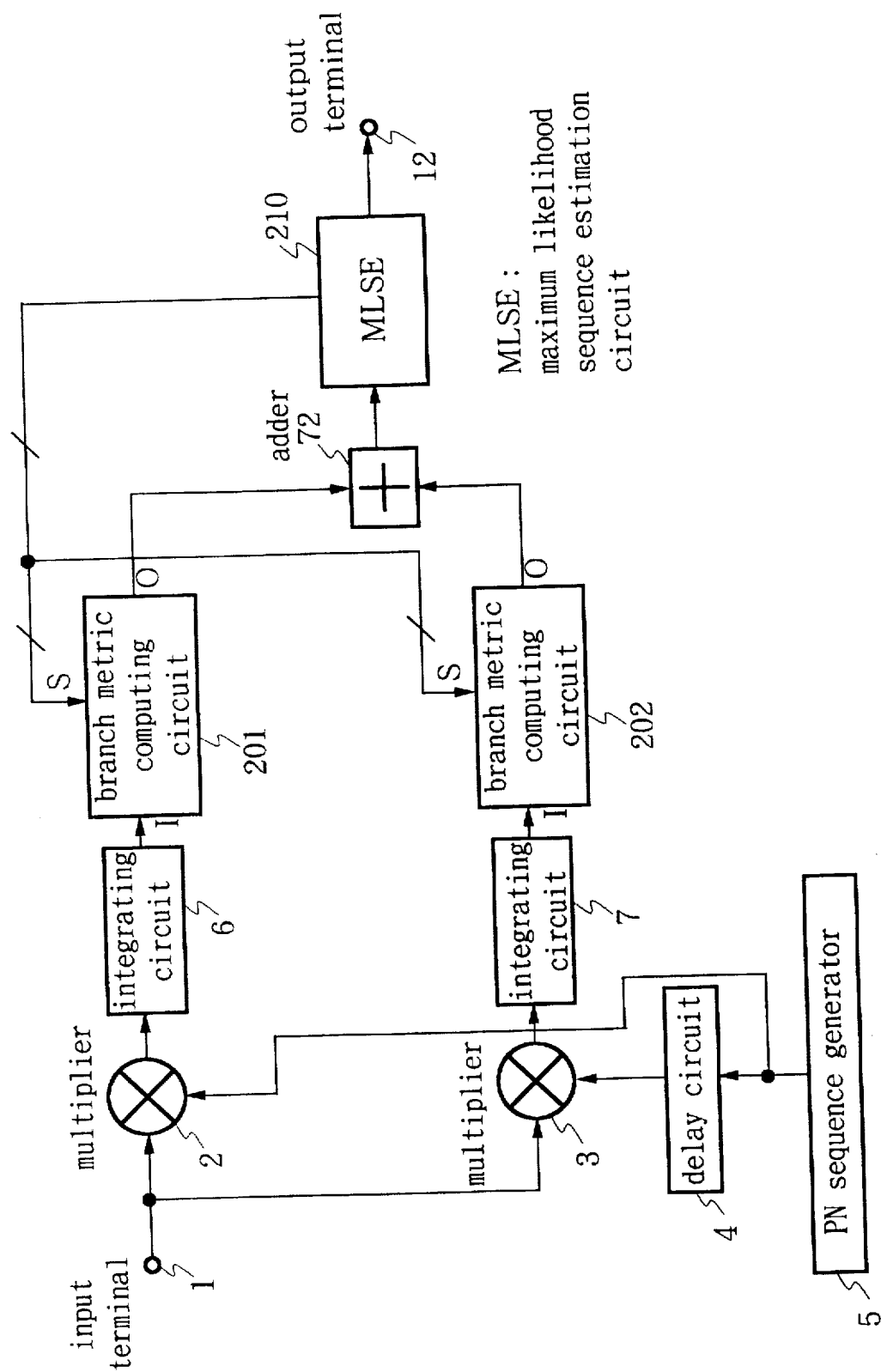
Fig.1 First embodiment of the invention

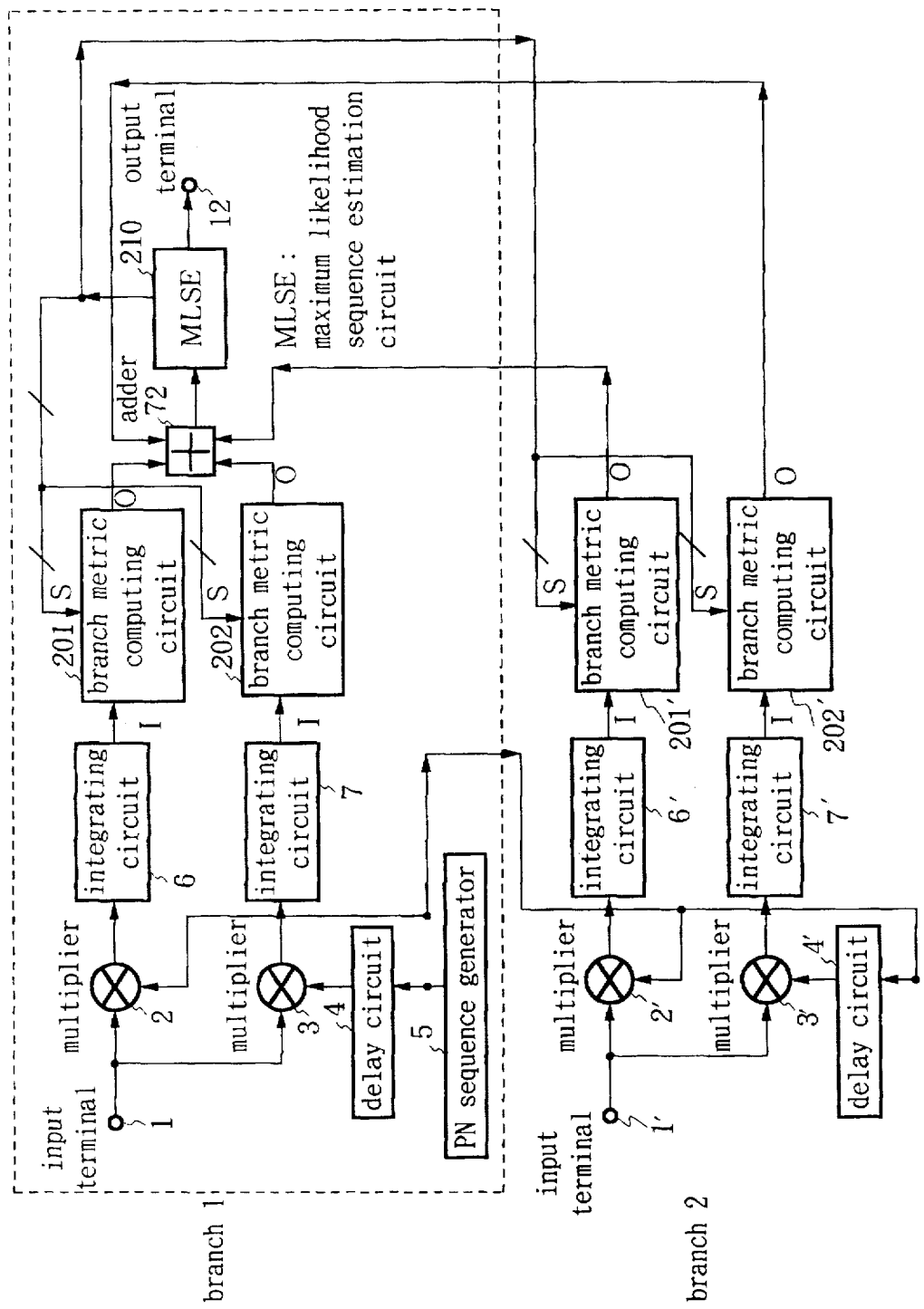
Fig.2 Two-branch diversity based on first embodiment

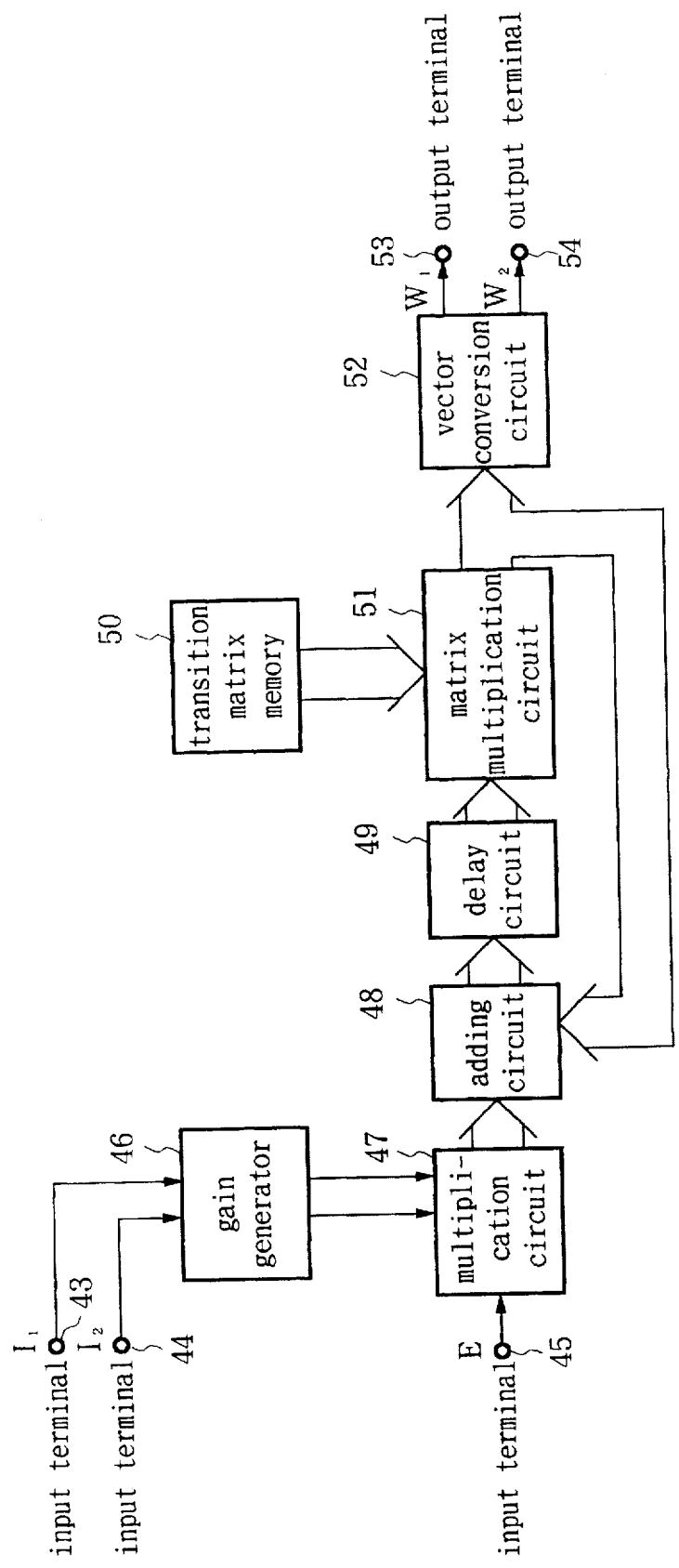
Fig.3 Tap coefficient control circuit according to this invention

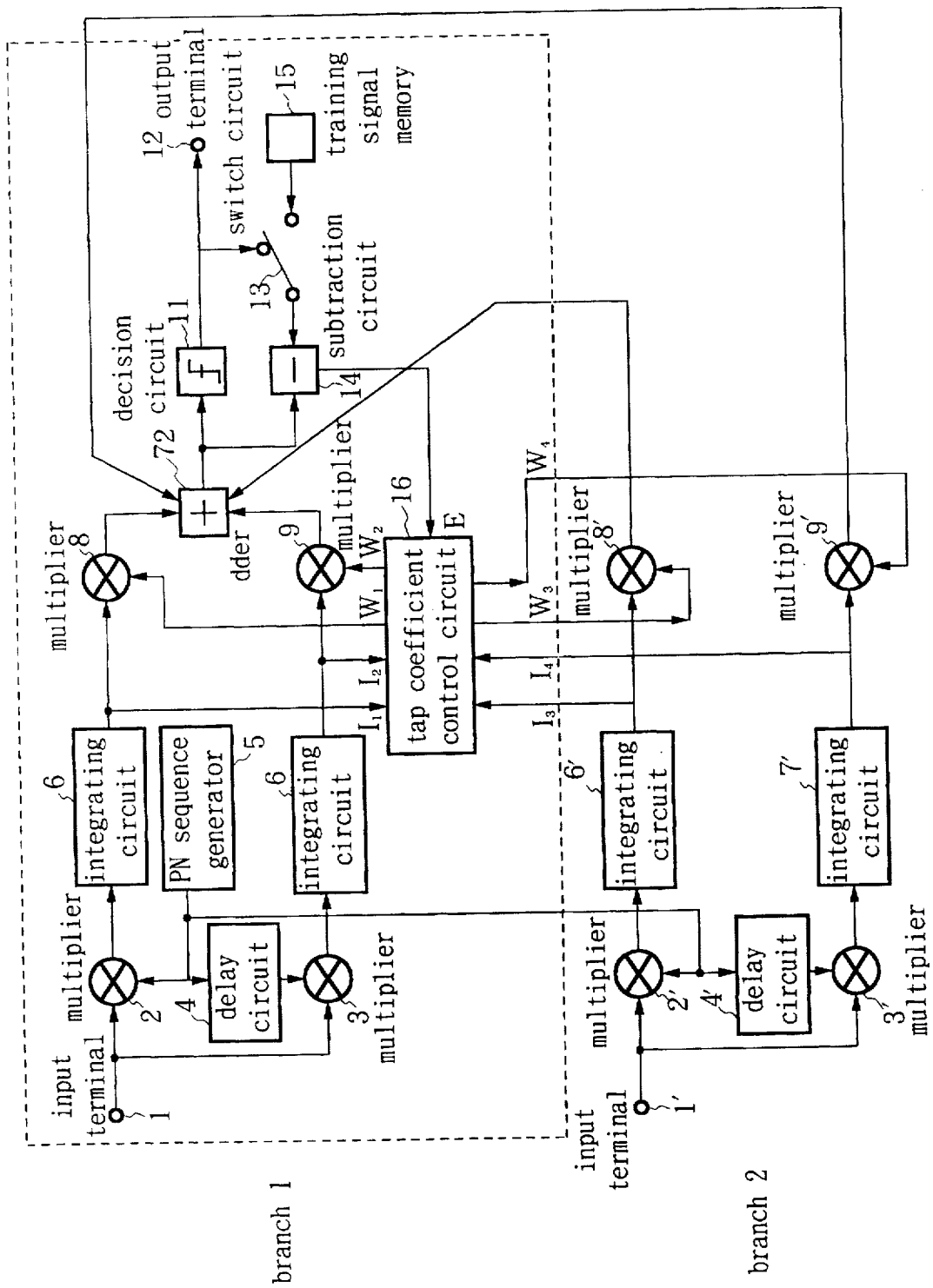
Fig. 4 Two-branch diversity based on second embodiment of the invention

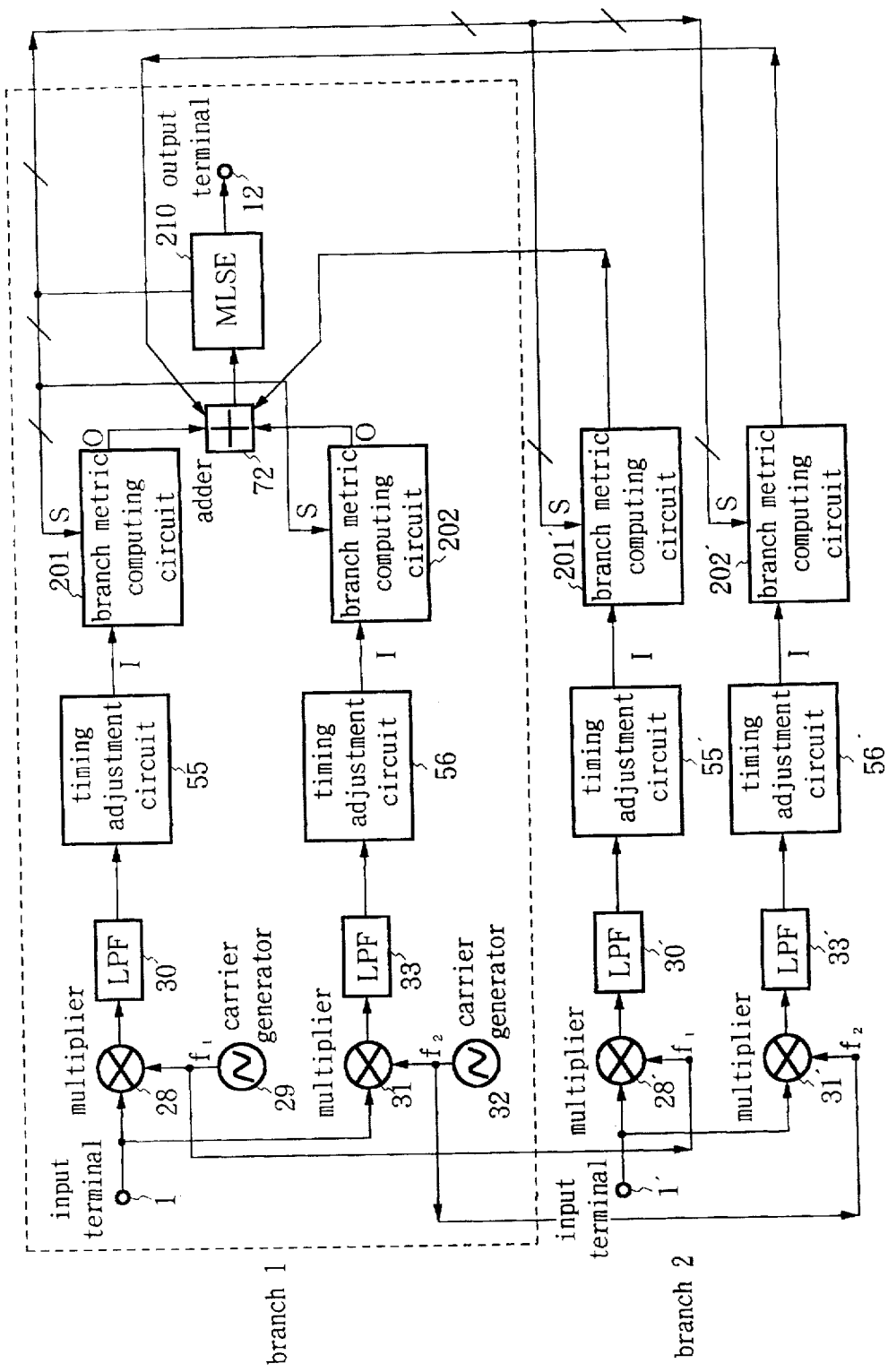
Fig.5 Two-branch diversity based on third embodiment of the invention

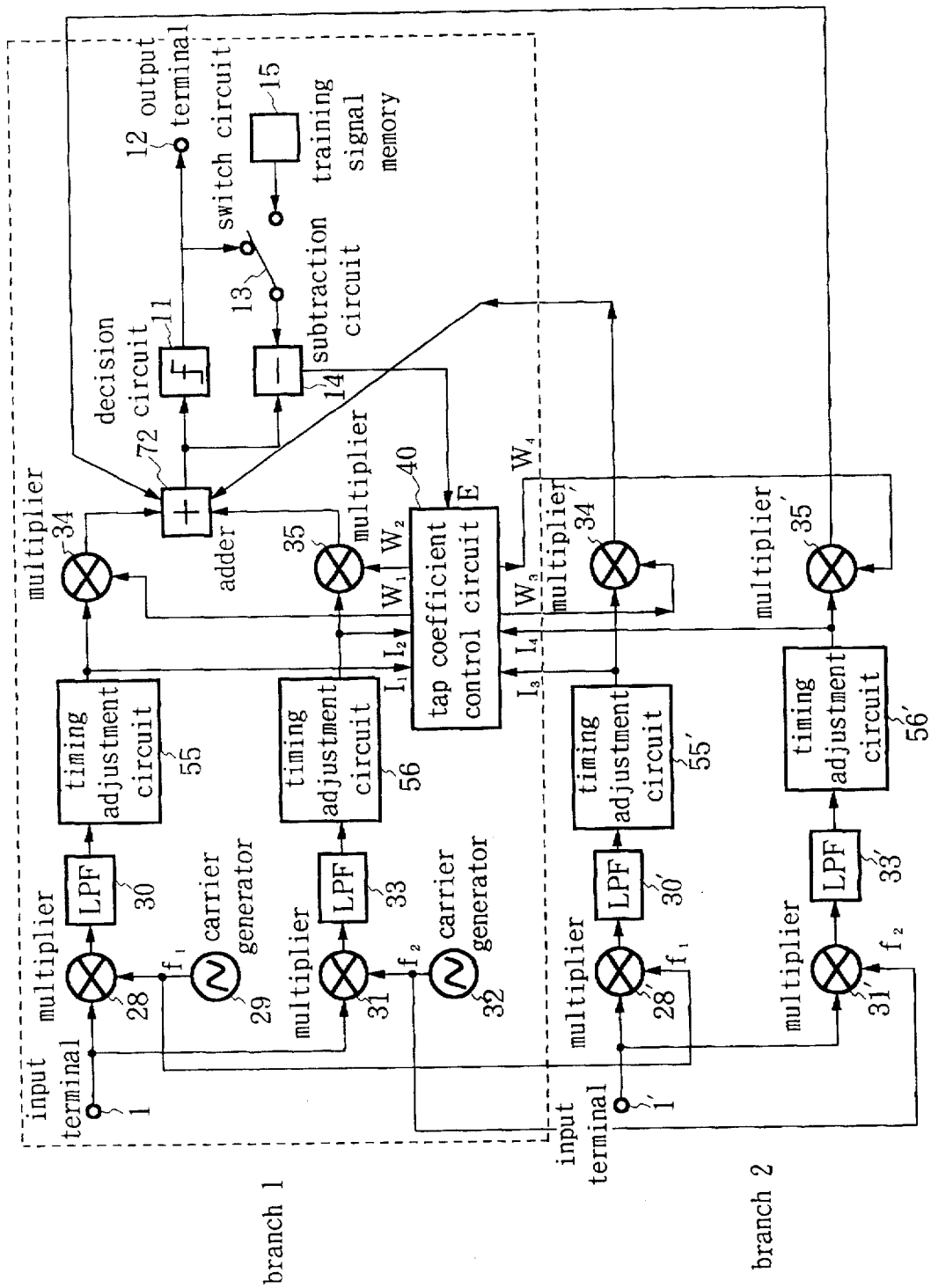
Fig.6 Fourth embodiment of the invention

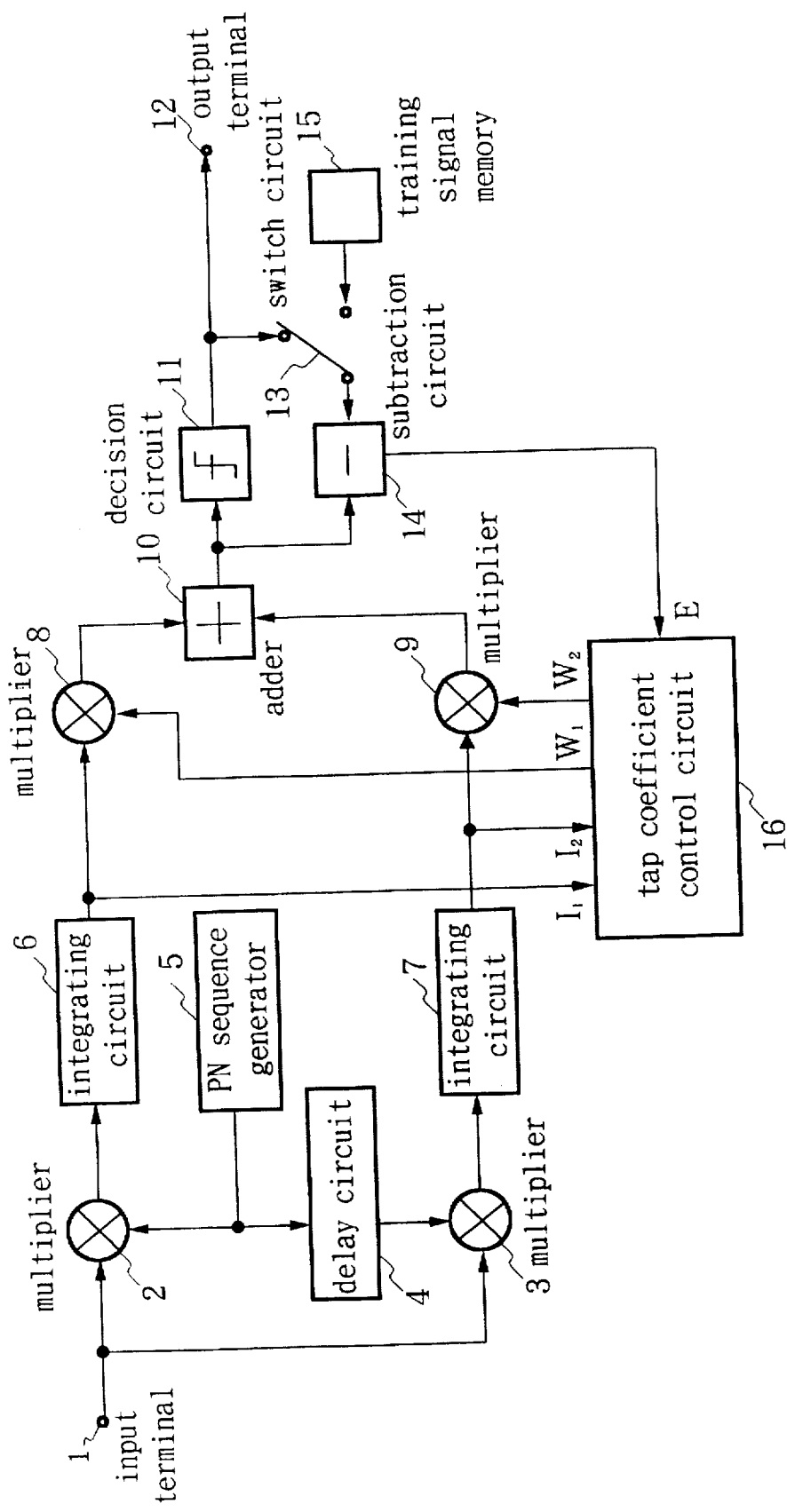
Fig.7 Prior art example of a direct sequence receiver

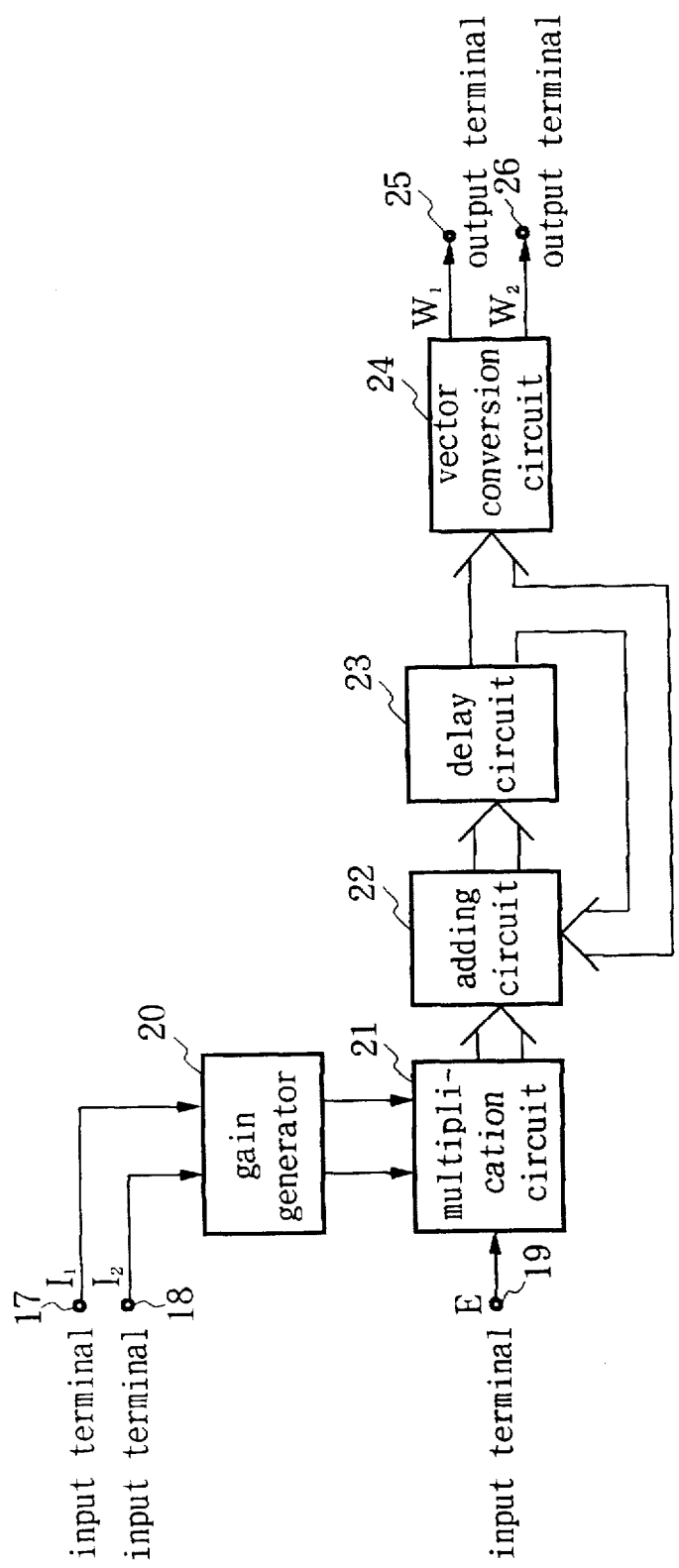
Fig.8　Prior art example of tap coefficient control circuit

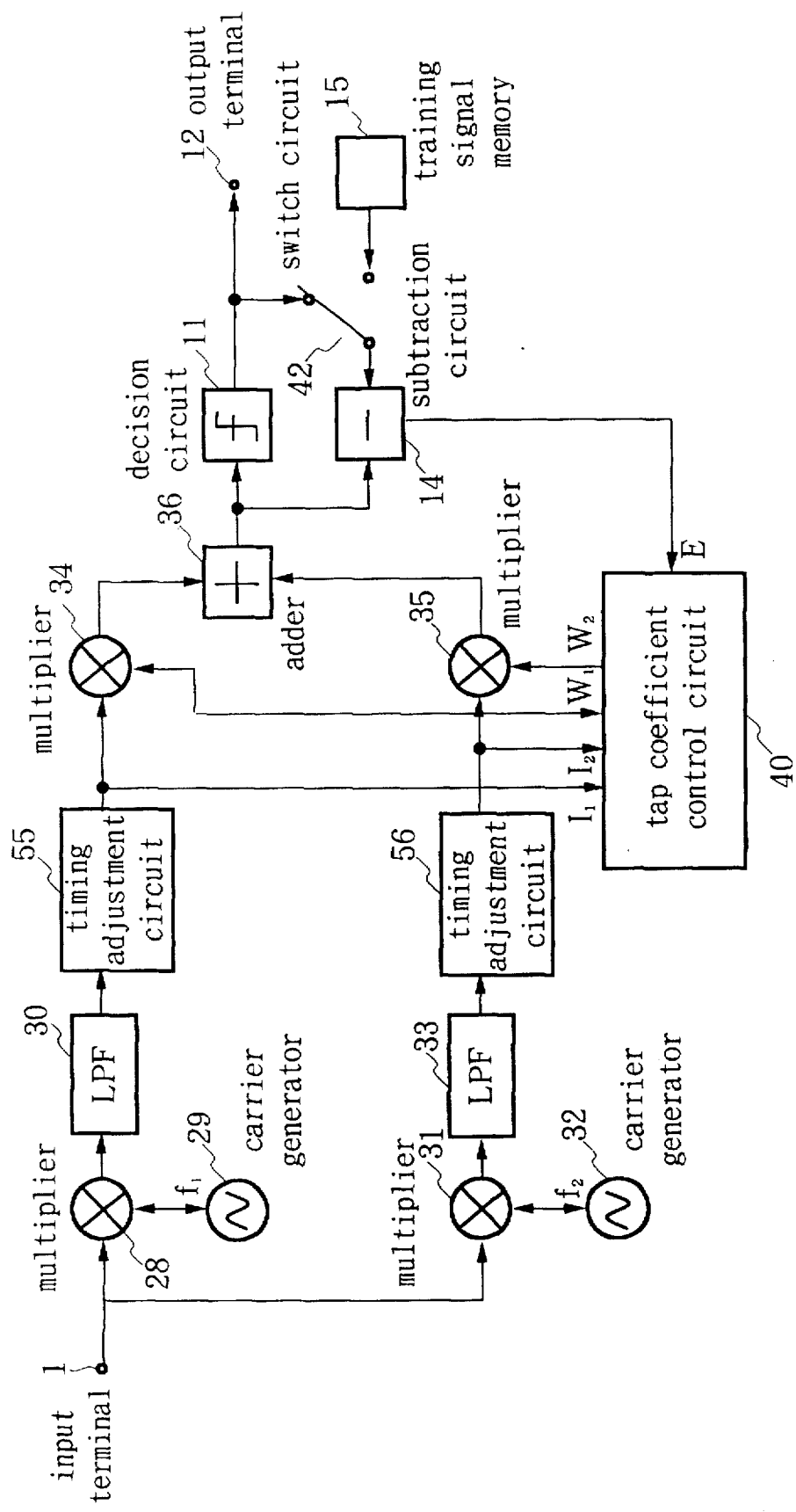
Fig.9 Prior art example of a frequency hopping receiver

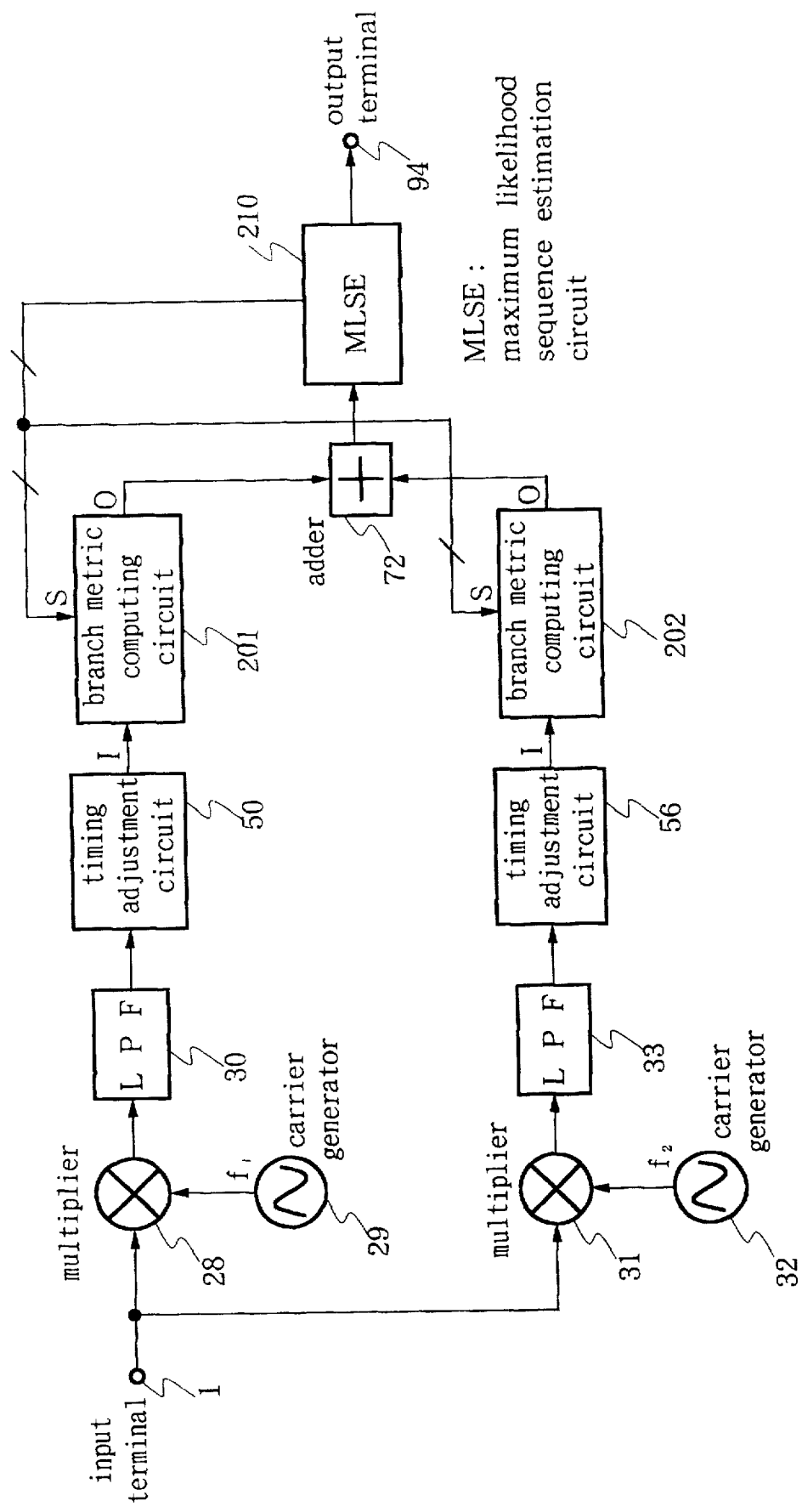
Fig.10 Prior art example of a frequency hopping receiver

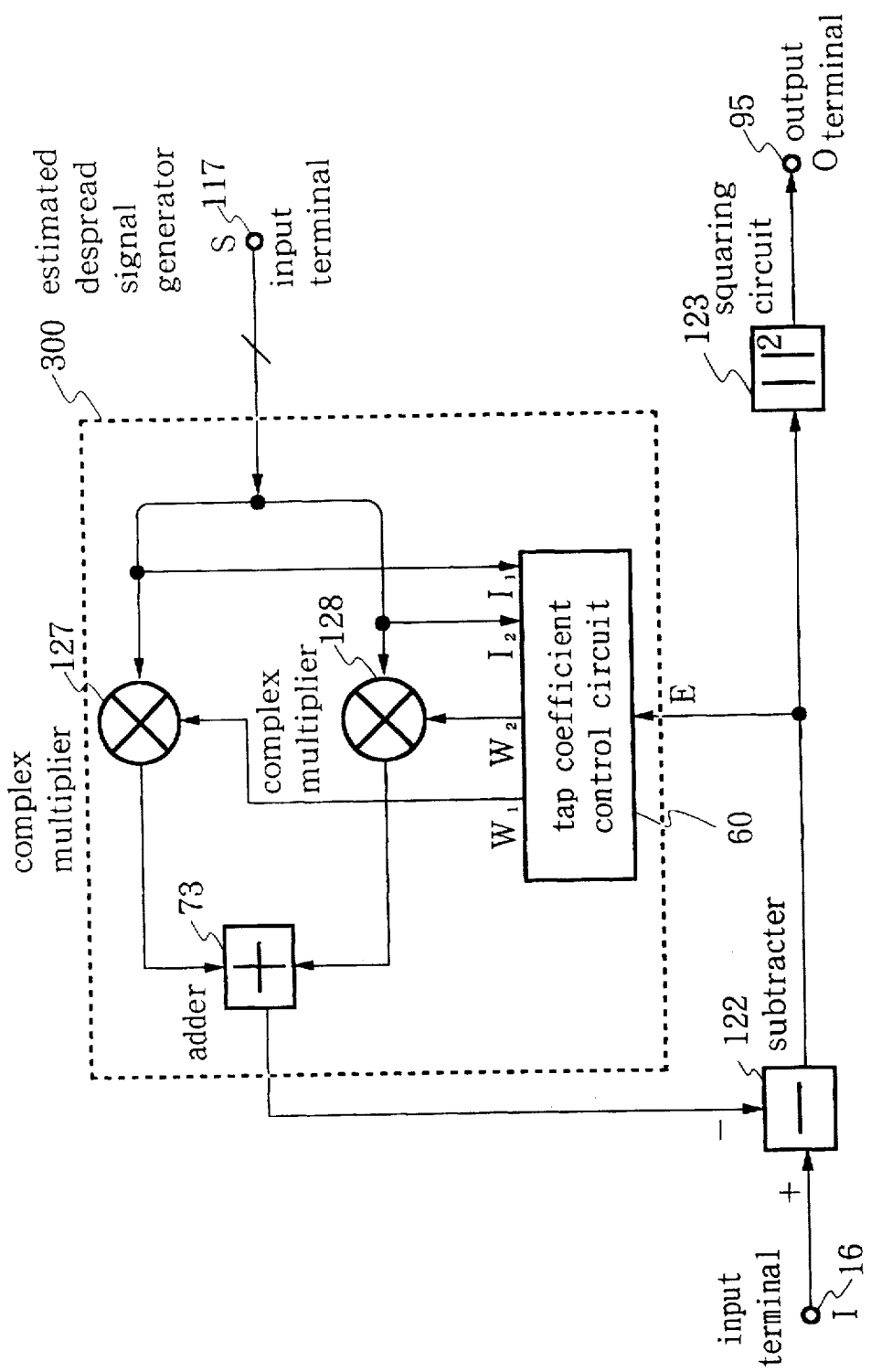
Fig.11 Branch metric computing circuit 5,757,844

SPREAD SPECTRUM RECEIVER

BACKGROUND OF THE INVENTION

1. Technical Field of the Invention

This invention is utilized for digital communications, and relates, in particular, to techniques for canceling interference signals in the received signal, and receiving under conditions of fast varying fading fluctuation, in spread spectrum communications.

2. Background of the Related Art

In recent years, in order to achieve effective utilization of frequency in digital mobile communications, code division multiple access systems which employ spread spectrum techniques have been studied. These spread spectrum techniques can be broadly divided into direct sequence systems and frequency hopping systems.

First, the configuration of an adaptive RAKE receiver will be explained with reference to FIG. 7. The receiver is a prior art example of a direct sequence receiver (see IEEE Journal on Selected Areas in Communications, Vol. 11, No. 7, September 1993). FIG. 7 is a block diagram of a prior art example of a direct sequence receiver. The explanation given here will assume a two-path model in which the propagation path is composed of a first arrival path and a delayed arrival path.

The received signal is inputted from inputted terminal 1. This received signal has been spread by a spreading code, such as a PN sequence, and in order to demodulate it, it has to be despread by the same spreading code. Multiplier 2 multiplies the received signal by the PN sequence outputted by PN sequence generator 5, and feeds the outputted to integrating circuit 6. This operation is equivalent to despreading. The PN sequence has a sharp autocorrelation, and if the timings of the PN sequences used in the transmitter and receiver do not coincide, despreading will not be successful. In this case, if the timing of the PN sequence outputted by PN sequence generator 5 coincides with that of the PN sequence of the first arrival path, the signal component corresponding to the first arrival path will be extracted from integrating circuit 6 and outputted as a despread signal.

Likewise, multiplier 3 multiplies the received signal by the delayed PN sequence that is outputted by delay circuit 4, and feeds the output integrating circuit 7. This operation is equivalent to despreading. If the timing of the PN sequence delayed by delay circuit 4 coincides with that of the PN sequence of the delayed arrival path, the signal component corresponding to the delayed arrival path will be extracted from integrating circuit 7 and outputted as a despread signal. Here, multipliers 2 and 3, delay circuit 4, PN sequence generator 5, and integrating circuits 6 and 7 correspond to a despreading and receiving means.

The despread signals are respectively multiplied by tap coefficients in multipliers 8 and 9, and are then added together by adder 10. The added signal that is outputted by adder 10 is fed to decision circuit 11, which corresponds to a signal decision means. Decision circuit 11 performs signal decision and outputs the decision signal from terminal 12. Subtraction circuit 14 calculates and outputs the difference between this decision signal and the added signal, i.e., the a priori estimation error. Note, that when a known training signal is contained in the received signal, the training signal outputted by training signal memory 15 is used instead of the decision signal during the training signal interval.

Switch circuit 13 performs this switching operation. Tap coefficient control circuit 16, which corresponds to a tap coefficient estimation means, receives as input the difference outputted by subtraction circuit 14, and the despread signals, and outputs the tap coefficients mentioned above.

Tap coefficient control circuit 16 employs a least mean square algorithm, for example, a recursive least mean square (RLS) algorithm in order to estimate the tap coefficients that minimize the square of the estimation error. This operation will be explained with reference to FIG. 8, which is a block diagram of a prior art example of tap coefficient control circuit 16.

The despread signals are inputted to gain generator 20 from input terminals 17 and 18. Gain generator 20 forms a gain vector and inputs this to multiplication circuit 21. Multiplication circuit 21 multiplies the gain vector by the aforementioned difference, i.e., the aforementioned a priori estimation error, which is inputted from input terminal 19, and outputs a correction vector. Adding circuit 22 adds together the a priori tap coefficient vector and the correction vector, thereby updating the a posteriori tap coefficient vector. Delay circuit 23 delays the a posteriori tap coefficient vector by a symbol period of the modulation signal, and inputs the delayed vector to adding circuit 22 and vector conversion circuit 24 as the a priori tap coefficient vector. Vector conversion circuit 24 outputs the elements of the a priori tap coefficient vector from output terminals 25 and 26 as tap coefficients.

The updating algorithm of the a priori tap coefficient vector will be explained by mathematical expressions. Hereinafter, all signals will be expressed by complex representation in which the real part indicates the in-phase component and the imaginary part indicates the quadrature component. First of all, the despread signal sequence will be expressed by the two-dimensional vector $C(i)$ shown below:

$$C^H(i) = [y_1(i) \ y_2(i)] \qquad (1)$$

where $y_1(i)$ is the despread signal which is the output of integrating circuit 6 at time i, $y_2(i)$ is the despread signal which is the output of integrating circuit 7 at time i, and the superscript H denotes complex conjugate transposition.

Next, the a posteriori tap coefficient vector $X(i)$ will be expressed by the following two-dimensional vector:

$$X^H(i) = [w^*_1(i) \ w^*_2(i)] \qquad (2)$$

where * denotes complex conjugate, $w_1(i)$ is the tap coefficient set in multiplier 8, and $w_2(i)$ is the tap coefficient set in multiplier 9. The posteriori tap coefficient vector $X(i)$ is estimated by the least mean square method so as to minimize the weighted square sum of the a posteriori estimation error $e(i)$ expressed by:

$$e(i) = d(i) - C^H(i)X(i) \qquad (3)$$

where $d(i)$ is the complex signal corresponding to the complex symbol of the modulation. A training signal is used as $d(i)$ in the training signal interval, while the decision signal is used as $d(i)$ in the data signal interval.

The a posteriori tap coefficient vector $X(i)$ can be estimated by a variety of methods, including the RLS algorithm which realizes the least squares method successively and strictly the fast RLS algorithm which performs this processing more efficiently and Fast Transversal Filter(FTF). In addition, LMS is a well-known way of obtaining an approximate estimation (see Haykin, Adaptive Filter Theory, Prentice-Hall, 1986).

Writing $X_e(i)$ for the RLS algorithm-based estimate of the a posteriori tap coefficient vector $X(i)$, the updating algorithm for $X_e(i)$ will be:

$$K(i) = \frac{[\lambda^{-1} \cdot P(i-1) \cdot C(i)]}{[1 + \lambda^{-1} \cdot C^H(i) \cdot P(i-1) \cdot C(i)]} \quad (4a)$$

$$\alpha(i) = d(i) - C^H(i) \cdot X_e(i-1) \quad (4b)$$

$$X_e(i) = X_e(i-1) + K(i) \cdot \alpha(i) \quad (4c)$$

$$P(i) = \lambda^{-1} \cdot P(i-1) - \lambda^{-1} \cdot K(i) \cdot C^H(i) \cdot P(i-1) \quad (4d)$$

where $P(i)$ is the inverse matrix of the autocorrelation matrix of $C(i)$, $K(i)$ is the gain vector, $X_e(i-1)$ is the estimate of the a priori tap coefficient vector, $\alpha(i)$ is the a priori estimation error, and $\lambda$ is the forgetting factor (a positive constant equal to or less than 1).

Next, a prior art example of a frequency hopping receiver will be explained with reference to FIG. 9, which is a block diagram of said receiver (see Technical Report of IEICE, RCS92-109 (1993-01) pp. 61-66). It will be assumed here that the carrier frequency of the received signal hops between two frequencies f1 and f2.

The received signal is inputted from input terminal 1. The carrier frequency of this received signal hops in a fixed pattern, and therefore in order to demodulate said received signal, it has to be despread using a carrier which is frequency hopped in an identical pattern. Multiplier 28 multiplies the received signal by a carrier with frequency f1 which is intermittently outputted by carrier generator 29, and feeds the output to low-pass filter 30. This operation is equivalent to despreading. Assuming that the timing of the carrier with frequency f1 which is outputted by carrier generator 29 coincides with that of the modulated carrier with frequency f1 contained in the received signal, the modulation signal which modulates carrier frequency f1 can be extracted from low-pass filter 30 and outputted as a despread signal.

Likewise, multiplier 31 multiplies the received signal by a carrier with frequency f2 which is intermittently outputted by carrier generator 32, and feeds the output to low-pass filter 33. This operation is equivalent to despreading. Assuming that the timing of the carrier with frequency f2 which is outputted by carrier generator 32 coincides with that of the modulated carrier with frequency f2 contained in the received signal, the modulation signal which modulates carrier frequency f2 can be extracted from low-pass filter 33 and outputted as a despread signal. Here, multipliers 28 and 31, carrier generators 29 and 32, and low-pass filters 30 and 33 correspond to a despreading and receiving means.

After being delayed and having their timing adjusted by timing adjustment circuits 55 and 56, the despread signals are respectively multiplied by tap coefficients in multipliers 34 and 35, and added together by adder 36. The added signal that is outputted by adder 36 is fed to decision circuit 11. Decision circuit 11 is equivalent to a signal decision means, and outputs the decision signal from output terminal 12. Subtraction circuit 14 calculates and outputs the difference between this decision signal and the added signal, i.e., the a priori estimation error. When a known training signal is contained in the received signal, the training signal outputted by training signal memory 15 is used instead of the decision signal during the training signal interval.

Switch circuit 42 performs this switching operation. Tap coefficient control circuit 40, which is equivalent to a tap coefficient estimation means, receives as input the difference outputted by subtraction circuit 14, and the timing-adjusted despread signals, and outputs the aforementioned tap coefficients. The constitution of this tap coefficient control circuit 40 is the same as that depicted in FIG. 8.

Next, another prior art example of a frequency hopping receiver will be explained with reference to FIG. 10 (see Technical Report of IEICE, CS93-54, RCS93-32, SST93-11 (1993-06), pp. 7-12). It is assumed here that the carrier frequency of the received signal hops between two frequencies f1 and f2.

The received signal is inputted from input terminal 1. In a frequency hopping system, the same frequency band is used by stations that have different hopping patterns. Therefore, a desired signal and interference signals will be superimposed in this received signal. The carrier frequency of the desired signal hops in one fixed pattern while the carrier frequency of the interference signals hop in different patterns. In order to demodulate the desired signal, the received signal has to be down-converted i.e., despread by using a carrier with the frequency which is hopped in the same pattern as the desired signal. Multiplier 28 multiplies the received signal by a carrier with frequency f1 which is intermittently outputted by carrier generator 29, and feeds the output to low-pass filter 30. This operation is equivalent to despreading. Assuming that the timing of the carrier with frequency f1 that is outputted by carrier generator 29 coincides with that of the modulated carrier with frequency f1 contained in the received signal, the modulation signal which modulates carrier with frequency f1 will be extracted from low-pass filter 30 and outputted as a despread signal. Timing adjustment circuit 55 makes this despread signal delayed and adjusts its timing.

Likewise, multiplier 31 multiplies the received signal by a carrier with frequency f2 which is intermittently outputted by carrier generator 32, and feed the output to low-pass filter 33. This operation is equivalent to despreading. Assuming that the timing with the carrier with frequency f2 that is outputted by carrier generator 32 coincides with that of the modulated carrier with frequency f2 contained in the received signal, the modulation signal which modulates carrier frequency f2 will be extracted from low-pass filter 33 and outputted as a despread signal.

Timing adjustment circuit 56 delays this despread signal and adjusts its timing. Here, multipliers 28 and 31, carrier generators 29 and 32, low-pass filters 30 and 33, and timing adjustment circuits 55 and 56 are equivalent to a despreading and receiving means. Branch metric computing circuits 201 and 202 receive as input the respective timing-adjusted despread signal, and the signal sequence candidates for the desired signal and the interference signal that are fed by maximum likelihood sequence estimation circuit 210, and output the square of the a priori estimation error.

Adder 72 computes the sum of the squares of the a priori estimation errors for all the despread signals and inputs this to maximum likelihood sequence estimation circuit 210. The result of multiplying this square sum of the a priori estimation errors by a negative constant is equivalent to the likelihood information for the signal sequence candidates, or in other words, to a branch metric. Maximum likelihood sequence estimation circuit 210 performs signal decision by means of maximum likelihood estimation based on the sum of the squares of the a priori estimation errors. In other words, it calculates the cumulative sum of the branch metrics as a logarithmic likelihood function, estimates the signal sequence candidate for which said function becomes maximum, and outputs the decision signal corresponding to the desired signal from output terminal 94. Maximum likelihood sequence estimation circuit 210 is equivalent to a signal decision means.

Next, branch metric computing circuits 201 and 202 will be explained with reference to FIG. 11, which is a block diagram of the circuits. Estimated despread signal generator 300 generates estimated despread signals as linear combinations of signal candidates for the desired signal and the interference signal. Signal sequence candidates for the desired and interference signals are inputted from input terminal 117. Complex multiplier 127 multiplies the desired signal signal candidates contained in the signal sequence candidate by tap coefficients and outputs the results, while complex multiplier 128 multiplies the interference signal candidates contained in the signal sequence candidate by tap coefficients and outputs the results. Adder 73 adds together the results of these multiplications and outputs the sums as estimated despread signals.

The despread signal is inputted from input terminal 16, and subtracter 122 subtracts the estimated despread signal estimate from the despread signal and outputs the result as the a priori estimation error. Squaring circuit 123 calculates the square of the a priori estimation error and outputs this from output terminal 95. Tap coefficient control circuit 60 receives as input the a priori estimation error outputted by subtracter 122, and the signal sequence candidates for the desired and interference signals. It estimates and outputs the tap coefficients by using a least mean square method such as the RLS (recursive least mean square) algorithm, so as to minimize the mean squared estimation error.

As has been explained above, in a conventional direct sequence spread spectrum system, because there is little correlation between different spreading codes, the signal from another stations, i.e., an interfering signal, can be regarded as low-level noise components in the despreading process if the level of the signals is small. However, when the level of the interference signals is very high, a high level interference signal components will remain in the despread signal corresponding to the desired signal. In the direct sequence spread spectrum receivers described above, the despread signals are linearly combined in order to remove this interference signal components. However, the drawback of linear combination is that if it is carried out to remove a high-level interference signal components, the level of the desired signal component contained in the linearly combined signal will be reduced, and transmission performance will deteriorate.

Furthermore, any fading fluctuations cause fluctuations in the optimum a posteriori tap coefficient vector X(i), and so the estimation of the a posteriori tap coefficient vector X(i) has to track the fading fluctuations. The least mean square method assumes that the a posteriori tap coefficient vector X(i) remains constant during a time constant determined by the forgetting factor, and so this method estimates the a posteriori tap coefficient vector X(i) by averaging over this time interval. Making the time constant short will result in better tracking of fading fluctuations, but making it too short will give rise to numerical divergence. Therefore, a shortcoming of the least mean square method is that it has limited tracking ability, and that transmission performance will deteriorate if the fading fluctuation exceeds this limit.

The present invention has been devised in the light of this situation, and its object is to provide a spread spectrum receiver capable of performing good signal decision even when the level of the interfering signal is high or when fading fluctuation is severe.

SUMMARY OF THE INVENTION

The present invention is characterized by a spread spectrum receiver including a despreading and receiving means which, for each path, despreads a received spread spectrum signal in which desired and interference signals are superimposed outputs the results as despread signals, and a means which outputs a decision signal corresponding to the desired signal. This invention provides a spread spectrum receiver which has means to which are inputted signal sequence candidates for the desired and interference signals, and which generate estimated despread signals corresponding to these signals means which respectively subtract these estimated despread signals from the despread signals for each path; means which square the results of these respective subtractions; and a means which adds the respective outputs of these squaring means; and wherein the means which outputs a decision signal corresponding to the desired signal has a signal decision means which performs signal decision by using the output of the adding means, and which outputs the decision signal corresponding to the desired signal, and the signal sequence candidates for the desired and interfering signals.

The means which generate estimated despread signals should have a means which generates estimated despread signals by respectively multiplying the signal sequence candidates for the desired and interference signals by tap coefficients and linearly combining the results of these multiplications; and a tap coefficient control circuit to which are fed these signal sequence candidates and the output of the subtracting means, and which estimates the tap coefficients.

The tap coefficient control circuit should have a memory which holds in advance a transition matrix which updates, as the aforementioned tap coefficients, values that include the Nth order differentials of these coefficients (where N is a natural number); and a matrix multiplication circuit which multiplies by this transition matrix in the course of the least mean square computation.

The transition matrix should be defined such that:

$$(\Phi)_{K,L} = \begin{cases} 1, & K = L \\ 1, & K = 2m, L = 2m - 1, \text{ where } m \text{ is a natural number} \\ 0, & \text{otherwise} \end{cases}$$

where K is the row number and L is the column number.

The despreading and receiving means is also capable of providing a diversity receiver if it has a means which, for each path, despreads signals received from a plurality of antennas and outputs the results as despread signals, and if the subtraction means have means which subtract the estimated despread signal from the despread signal corresponding to each of the antennas and to each path.

The present invention is also characterized by a spread spectrum receiver which has a despreading and receiving means which respectively despreads, for each path, the received spread spectrum signal; means which respectively multiply the despread signals that are outputted from this means by tap coefficients; a means which adds the respective outputs of these multiplication means; a signal decision means to which is fed the output of this adding means and which performs signal decision and outputs the decision signal; a subtraction circuit which computes the difference between the output of the adding means and this decision signal; and a tap coefficient control circuit to which is fed this difference and the despread signals, and which estimates the tap coefficients by means of least mean square computation.

This invention provides a spread spectrum receiver in which the tap coefficient control circuit has a memory which holds in advance a transition matrix which updates, as the aforementioned tap coefficients, values that include the Nth order differentials of these coefficients (where N is a natural number); and a matrix multiplication circuit which multiplies by this transition matrix in the course of the least mean square computation.

The aforementioned transition matrix should be defined such that:

$$(\Phi)_{K,L} = \begin{cases} 1, & K = L \\ 1, & K = 2m, L = 2m - 1, \text{ where } m \text{ is a natural number} \\ 0, & \text{otherwise} \end{cases}$$

where K is the row number and L is the column number.

The despreading and receiving means is also capable of providing a diversity receiver which has a means which, for each path, despreads signals received from a plurality of antennas and outputs the results as despread signals.

The present invention is also characterized by a spread spectrum receiver which has a despreading and receiving means which separates a received spread spectrum signal into modulation signals corresponding to different carriers, the received spread spectrum signal comprising superimposed desired and interfering signals, and which outputs the results as a plurality of despread signals; means to which are fed signal sequence candidates for the desired and interference signals, and which generate estimated despread signals corresponding to these signals; means which respectively subtract these estimated despread signals from the despread signals for each despread signal; means which square the results of these respective subtractions; a means which adds the outputs of these squaring means; and a signal decision means which performs signal decision by using the output of this adding means, and which outputs the decision signal corresponding to the desired signal and the signal sequence candidates for the desired and interference signals; and wherein the means which generate estimated despread signals have a means which generates estimated despread signals by respectively multiplying the signal sequence candidates for the desired and interference signals by tap coefficients and linearly combining the results of these multiplications; and a tap coefficient control circuit to which are fed these signal sequence candidates and the output of the subtracting means, and which estimates the tap coefficients.

This invention provides a spread spectrum receiver in which the tap coefficient control circuits have a memory which holds in advance a transition matrix which updates, as the tap coefficients, values that include the Nth order differentials of these coefficients (where N is a natural number); and a matrix multiplication circuit which multiplies by this transition matrix in the course of the least mean square computation.

The aforementioned transition matrix should be defined such that:

$$(\Phi)_{K,L} = \begin{cases} 1, & K = L \\ 1, & K = 2m, L = 2m - 1, \text{ where } m \text{ is a natural number} \\ 0, & \text{otherwise} \end{cases}$$

where K is the row number and L is the column number.

The despreading and receiving means is also capable of providing a diversity receiver which has a means which separates signals received from a plurality of antennas into modulation signals corresponding to different carriers, and which outputs these as a plurality of despread signals.

The present invention is also characterized by a spread spectrum receiver which has a despreading and receiving means which despreads the received spread spectrum signal into modulation signals corresponding to different carriers; means which respectively multiply the despread signals that are outputted from this means by tap coefficients; a means which adds the outputs of these multiplication means; a signal decision means to which is fed the output of this adding means and which performs signal decision and outputs the decision signal; a subtraction circuit which computes the difference between the output of the adding means and this decision signal; and a tap coefficient control circuit to which is fed this difference and the despread signals, and which estimates the tap coefficients by means of least meant square computation.

This invention provides a spread spectrum receiver in which the aforementioned tap coefficient control circuit has a memory which holds in advance a transition matrix which updates, as the aforementioned tap coefficients, values that include the Nth order differentials of these coefficients (where N is a natural number); and a matrix multiplication circuit which multiplies by this transition matrix in the course of the least mean square computation.

The aforementioned transition matrix should be defined such that:

$$(\Phi)_{K,L} = \begin{cases} 1, & K = L \\ 1, & K = 2m, L = 2m - 1, \text{ where } m \text{ is a natural number} \\ 0, & \text{otherwise} \end{cases}$$

where K is the row number and L is the column number.

The despreading and receiving means is also capable of providing a diversity receiver which has a means which separates signals received from a plurality of antennas into modulation signals corresponding to different carriers, and which outputs these as a plurality of despread signals.

The received signal is separated into its respective path components or into modulation signals corresponding to respective carriers, and output as a plurality of despread signals. Subsequent processing can take either of the two following forms. (1) Each despread signal is multiplied by tap coefficients, the results added together, and signal decision performed. The difference between the added signal and the decision signal is the a priori estimation error. This a priori estimation error and the despread signals are used as input for tap coefficient estimation.

(2) Alternatively, for each despread signal, signals sequence candidates for the desired and interference signals are multiplied by tap coefficients, and despread signal estimates are generated. The despread signal estimates are subtracted from the respective despread signals, thereby generating a priori estimation errors. Signal decision is performed on the basis of them. Tap coefficient estimation is performed by using as input the a priori estimation error and the signal sequence candidates for the desired and interference signals.

In this invention, the tap coefficients are estimated by employing an RLS algorithm in which the a priori tap coefficient vector is replaced with the result obtained by multiplying the a priori tap coefficient vector by a transition matrix. Use of this algorithm enables estimation to be performed on the basis of regarding the tap coefficient vector as fluctuating as an Nth order function of time in the time width of the time constant.

This enables good signal decision to be carried out even when the level of the interference signals is high or when there is severe varrying fading fluctuation. Even better signal decision can be achieved by having a diversity structure.

BRIEF DESCRIPTION OF THE DRAWINGS

FIG. 1 is a block diagram of a first embodiment of this invention.

FIG. 2 shows two-branch diversity structure using the structure of the first embodiment.

FIG. 3 is a block diagram of the tap coefficient control circuits in a second embodiment of this invention.

FIG. 4 shows two-branch diversity structure using the structure of the second embodiment.

FIG. 5 shows the structure of two-branch diversity structure in a third embodiment of this invention.

FIG. 6 is a block diagram of a fourth embodiment of this invention.

FIG. 7 is a block diagram of a prior art example of a direct sequence receiver.

FIG. 8 is a block diagram of a prior art example of tap coefficient control circuit 16 in FIG. 7.

FIG. 9 is a block diagram of a prior art example of a frequency hopping receiver.

FIG. 10 shows another prior art example of a frequency hopping receiver.

FIG. 11 is a block diagram of a branch metric computing circuit.

DESCRIPTION OF THE PREFERRED EMBODIMENT

Optimum Configurations for Embodying the Invention

First embodiment

A first embodiment of this invention will be explained with reference to FIG. 1, which is a block diagram of said first embodiment.

This invention is a spread spectrum receiver which comprises multipliers 2 and 3, delay circuit 4, PN sequence generator 5 and integrating circuits 6 and 7, which together serve as a despreading and receiving means which, for each path, despreads the received spread spectrum signal in which desired and interference signals are superimposed, and outputs the results as despread signals. The spread spectrum receiver also comprises maximum likelihood sequence estimation circuit 210 which serves as a means which outputs a decision signal corresponding to the desired signal.

A distinguishing feature of this invention is that it has estimated despread signal generators 300 which serve as means which, as shown in FIG. 11, generate estimated despread signals after receiving as input signal sequence candidates for the desired and interference signals. Subtracters 122 serve as means for respectively subtracting these estimated despread signals from the despread signals of each of the paths. Squaring circuits 123 serve as means for squaring the results of these respective subtractions. Adder 72 (see FIG. 1) serves as a means for adding the respective outputs of these squaring circuits 123. A further distinguishing feature of this invention is that maximum likelihood sequence estimation circuit 210 has a signal decision means which performs signal decision by using the output of the adder 72, and which outputs the decision signal corresponding to the desired signal, and the signal sequence candidates for the desired and interfering signals. FIG. 11 is an example of the structure employed when there is one interference signal, but it is easy to extend this to cases where there are two or more interference signals.

Next, the working of this first embodiment of the invention will be explained. The propagation path will be assumed to be composed of first arrival path and a delayed arrival path. The received signal is inputted from input terminal 1. Multiplier 2 multiplies the received signal by the spreading code for the desired signal which is outputted by PN sequence generator 5, and inputs the result to integrating circuit 6. This operation is equivalent to despreading. The PN sequence used as a spreading code has a sharp autocorrelation, and the signal cannot be extracted if the timings of the spreading codes used in transmitting and receiving do not coincide. Assuming that the timing of the spreading code which is outputted by PN sequence generator 5 coincides with that of the spreading code of the first arrival path, the signal component corresponding to the first arrival path can be extracted from integrating circuit 6 and outputted as a despread signal.

Likewise, multiplier 3 multiplies the received signal by the delayed spreading code for the desired signal which is outputted by delay circuit 4, and inputs the result to integrating circuit 7. This operation is equivalent to despreading. Assuming that the timing of the delayed spreading code coincides with that of the spreading code of the delayed arrival path, the signal component corresponding to the delayed arrival path can be extracted from integrating circuit 7 and outputted as a despread signal. Here, multipliers 2 and 3, delay circuit 4, PN sequence generator 5, and integrating circuits 6 and 7 correspond to the despreading and receiving means.

Branch metric computing circuits 201 and 202 receive as input the respective despread signals, and signal sequence candidates for the desired and interfering signals that are outputted by maximum likelihood sequence estimation circuit 210, and output the square of the a priori estimation error. Adder 72 computes the sum of the squares of the a priori estimation errors of the respective despread signals, and inputs this to maximum likelihood sequence estimation circuit 210. The result of multiplying this square sum of the a priori estimation errors by a negative constant is equivalent to the likelihood information for the signal sequence candidates, or in other words, to a branch metric.

Maximum likelihood sequence estimation circuit 210 performs signal decision by means of maximum likelihood estimation based on the square sum of the a priori estimation errors. In other words, it calculates the cumulative sum of the branch metrics as a logarithmic likelihood function, estimates the signal sequence candidate for which said function becomes maximum, and outputs the decision signal corresponding to the desired signal from output terminal 12. Maximum likelihood sequence estimation circuit 210 is equivalent to the signal decision means. Although it has been assumed here that there are two propagation paths, the foregoing can easily be extended to cases where there are three or more paths.

Next, two-branch diversity using the structure of this first embodiment will be explained with reference to FIG. 2, which shows said two-branch diversity. The signal received from the first diversity branch, i.e., from a first antenna, is inputted from input terminal 1. Multiplier 2 multiplies the received signal by the spreading code for the desired signal, the spreading code being outputted by PN sequence generator 5, and feeds the result to integrating circuit 6. This operation is equivalent to despreading. The PN sequence used as the spreading code has a sharp autocorrelation, and the signal cannot be extracted if the timings of the spreading codes used in transmitting and receiving do not coincide. Assuming that the timing of the spreading code that is outputted by PN sequence generator 5 coincides with that of the spreading code of the first arrival path, the signal component corresponding to the first arrival path will be extracted from integrating circuit 6 and outputted as a despread signal.

Likewise, multiplier 3 multiplies the received signal by the delayed spreading code of the desired signal, said delayed spreading code being outputted by delay circuit 4, and feeds the result to integrating circuit 7. This operation is equivalent to despreading. If the timing of the delayed spreading code coincides with that of the spreading code of the delayed path, the signal component corresponding to the delayed arrival path will be extracted from integrating circuit 7 and outputted as a despread signal. Branch metric computing circuits 201 and 202 receive as input the respective despread signals of the first diversity branch and the signal sequence candidates for the desired and interference signals that are outputted by maximum likelihood sequence estimation circuit 210, and output the square of the a priori estimation error.

Meanwhile, the signal received from the second diversity branch, i.e., from a second antenna, is inputted from input terminal 1'. Multiplier 2' multiplies the received signal by the spreading code for the desired signal which is outputted by PN sequence generator 5, and feeds the result to integrating circuit 6'. If the timing of the spreading code generated by PN sequence generator 5 coincides with that of the spreading code of the first arrival path, the signal component corresponding to the first arrival path will be extracted from integrating circuit 6' and outputted as a despread signal.

Likewise, multiplier 3' multiplies the received signal by the delayed spreading code for the desired signal, the delayed spreading code outputted by delay circuit 4', and feeds the result to integrating circuit 7'. This operation is equivalent to despreading. If the timing of the delayed spreading code coincides with that of the spreading code of the delayed arrival path, the signal component corresponding to the delayed arrival path will be extracted from integrating circuit 7' and outputted as a despread signal. Here, multipliers 2, 3, 2' and 3', delay circuits 4 and 4', and integrating circuits 6, 7, 6' and 7' correspond to the despreading and receiving means.

Branch metric computing circuits 201' and 202' receive as input the despread signals in the second diversity branch and the signal sequence candidates for the desired and interference signals which are outputted by maximum likelihood sequence estimation circuit 210, and output the square of the a priori estimation error. Adder 72 computes the sum of the squares of the a priori estimation errors that are outputted by branch metric computing circuits 201, 202, 201' and 202', and inputs this to maximum likelihood sequence estimation circuit 210. The result of multiplying this square sum of the a priori estimation errors by a negative constant is equivalent to the likelihood information for the signal sequence candidates, or in other words, to a branch metric.

Maximum likelihood sequence estimation circuit 210 performs signal decision by means of maximum likelihood estimation based on the square sum of the a priori estimation errors. In other words, it calculates the cumulative sum of the branch metrics as a logarithmic likelihood function, estimates the signal sequence candidate for which said function becomes maximum, and outputs the decision signal corresponding to the desired signal from output terminal 12. Maximum likelihood sequence estimation circuit 210 is equivalent to the signal decision means. Because diversity reception is employed, bit error rate performance are better than when diversity reception is not employed.

Second embodiment

A second embodiment of this invention will be explained with reference to FIG. 3, which is a block diagram of the tap coefficient control circuit in this second embodiment. Reference should be made to FIG. 7 for the overall constitution of this embodiment. Although the structure illustrated in FIG. 7 is for the case where there are two propagation paths, this can easily be extended to three or more paths.

As already shown in FIG. 7, this invention is a spread spectrum receiver which has multipliers 2 and 3, delay circuit 4, PN sequence generator 5, and integrating circuits 6 and 7, which together serve as a despreading and receiving means which, for each path, respectively despreads the received spread spectrum signal. Multipliers 8 and 9 serve as means for respectively multiplying the despread signals that are outputted from this means by tap coefficients. Adder 10 serves as a means for adding the outputs of these multipliers 8 and 9. Decision circuit 11, serves as a signal decision means to which is fed the output of this adder 10 and performs signal decision and outputs the decision signal. Subtraction circuit 14 computes the difference between the output of adder 10 and the decision signal. Tap coefficient control circuit 16 is fed this difference and the despread signals, and which estimates the tap coefficients.

The distinguishing feature of this invention is that, as shown in FIG. 3, tap coefficient control circuit 16 has transition matrix memory 50 which holds in advance a transition matrix which updates, as the aforementioned tap coefficients, values that include the Nth order differentials of these coefficients (where N is a natural number). Furthermore, a matrix multiplication circuit 51 multiplies by this transition matrix in the course of the least mean square computation. The explanation to be given here will assume that N=1.

The operation of tap coefficient control circuit 16 will now be explained. Despread signals are fed to gain generator 46 from feed terminals 43 and 44. Gain generator 46 generates a gain vector and inputs this to multiplication circuit 47. Multiplication circuit 47 multiplies the gain vector by the aforementioned difference, which is inputted from input terminal 45, i.e., it multiplies the gain vector by the a priori estimation error, and outputs a corrected vector. Adding circuit 48 adds the a priori tap coefficient vector and the corrected vector, and thereby updates the a posteriori tap coefficient vector. Delay circuit 49 delays the a posteriori tap coefficient vector by a symbol period of the modulation, and matrix multiplication circuit 51 multiplies this delayed a posteriori tap coefficient vector by the transition matrix that is outputted from transition matrix memory 50, and feeds the result to adding circuit 48 and to vector conversion circuit 52 as the a priori tap coefficient vector. Vector conversion circuit 52 outputs the elements of the a priori tap coefficient vector from output terminals 53 and 54 as tap coefficients.

The overall operation of tap coefficient control circuit 16 is equivalent to executing an updating algorithm. Letting the delay time of delay circuit 49 be T and the time constant of the updating algorithm be $\tau$, T will be smaller than $\tau$ ($\tau$ is approximately equal to 5T). In the prior art example shown in FIG. 7, the tap coefficient vector is estimated by means of the RLS algorithm on the assumption that it is constant during time g, but in tap coefficient control circuit 16 according to this second embodiment of the invention (see FIG. 3), the tap coefficient vector within time $\tau$ is estimated on the assumption that it also contains increases or decreases which are first order functional in nature. This is accomplished by multiplying the delayed a posteriori tap coefficient vector that is outputted from delay circuit 49 by the transition matrix stored in advance in transition matrix memory 50. By this means, tap coefficient control circuit 16 with good tracking ability can be achieved.

An explanation will be given of an updating algorithm involving the a priori tap coefficient vector (see IEICE, B-II, Vol.J75-B-II, No. 7, pp. 415–423, July 1992). First of all, the despread signal sequence will be represented by the following four-dimensional vector $C^H_{ext}(i)$:

$$C^H_{ext}(i) = [0 \; y_1(i) \; 0 \; y_2(i)] \tag{5}$$

where $y_1(i)$ is the despread signal that is outputted by integrating circuit 6 in FIG. 7 and $y_2(i)$ is the despread signal that is outputted by integrating circuit 7 in the same figure. Next, the a posteriori tap coefficient vector $X^H_{ext}(i)$ will be represented by the following four-dimensional vector:

$$X^H_{ext}(i) = [w_1^{(1)*}(i) \; w_1^*(i) \; w_2^{(1)*}(i) \; w_2^*(i)] \tag{6}$$

where $w_1(1)(i)$ and $w_2(1)(i)$ represent first order differentials of the tap coefficients with respect to time. The matrix elements of the 4~4 transition matrix h are defined as follows:

$$(\Phi)_{KL} = \begin{cases} 1, & K = L \\ 1, & K = 2m, L = 2m-1, \\ & \text{where } m \text{ is a natural number} \\ 0, & \text{otherwise} \end{cases} \tag{7}$$

This algorithm performs estimation on the basis of regarding the tap coefficients as fluctuating as first order functions of time in the time width of the time constant. If a Kalman filter is applied to the estimation of the a posteriori tap coefficient vector $X_{ext}(i)$, the updating algorithm for $X_{ext}(i)$ becomes:

$$K_{ext}(i) = P_{ext}(i|i-1) \cdot C_{ext}(i) \cdot [C^H_{ext}(i) \cdot P_{ext}(i|i-1) \cdot C_{ext}(i) + 1]^{-1} \tag{8a}$$

$$\alpha_{ext}(i) = d(i) - C^H_{ext}(i) \cdot \Phi \cdot X_{ext}(i-1) \tag{8b}$$

$$X_{ext}(i) = \Phi \cdot X_{ext}(i-1) + K_{ext}(i) \cdot \alpha_{ext}(i) \tag{8c}$$

$$P_{ext}(i|i) = P_{ext}(i|i-1) - K_{ext}(i) \cdot C^H_{ext}(i) \cdot P_{ext}(i|i-1) \tag{8d}$$

$$P_{ext}(i+1|i) = \Phi \cdot P_{ext}(i) \cdot \Phi^H + \sigma_n^{-2} \cdot Q(i) \tag{8e}$$

where $\alpha_{ext}(i)$ is the a priori estimation error, en2 the thermal noise power, and $P_{ext}(i)$ and $P_{ext}(i|i-1)$ are the results of normalising the a posteriori covariance matrix and the a priori covariance matrix of the tap coefficient vector by en2. $Q(i)$ is the autocorrelation matrix of the process noise, and substantially determines the aforementioned time constant τ. By setting:

$$Q(i) = q \cdot \sigma_n^2 \cdot \Phi \cdot P_{ext}(i) \cdot \Phi^H$$

the time constant g can be written τ=(1+q)/q. Here, q is a positive number. Furthermore, the a priori tap coefficient vector at time i becomes:

$$\Phi \cdot X_{ext}(i-1)$$

This algorithm performs estimation on the basis of regarding the tap coefficient vector as fluctuating as a first order function of time in the time width of the time constant. On the other hand, the conventional least mean square method estimates the tap coefficient vector on the assumption that it does not fluctuate with time in the time width of the time constant. This algorithm is therefore superior to the least mean square method in respect of tracking ability. It follows that this invention operates well even when there is severe fast varying fading fluctuation.

An algorithm based on a Kalman filter has been explained above, but it is also possible to apply a simplified algorithm. This simplified algorithm may be expressed mathematically as follows:

$$\alpha_{ext}(i) = d(i) - C^H_{ext}(i) \cdot \Phi \cdot X_{ext}(i-1) \tag{9a}$$

$$X_{ext}(i) = \Phi \cdot X_{ext}(i-1) + \mu D(i) \alpha_{ext}(i) \tag{9b}$$

where f is a constant which satisfies the condition that 0<f<1, and D(i) is the following four-dimensional vector:

$$D(i) = [\mu y_1(i) \; (2-\mu)y_1(i) \; \mu y_2(i) \; (2-\mu)y_2(i)] \tag{9c}$$

The simplified algorithm expressed by Eqs. 9a–9c is the result of replacing $K_{ext}(i)$ in Eqs. 8a–8e as follows:

$$K_{ext}(i) \to \mu D(i) \tag{9d}$$

and has the advantage of requiring less computation than the Kalman filter. A simplified algorithm can also be derived by replacing $P_{ext}(i)$ in Eqs. 8a–8e with a fixed matrix (see IEICE, B-II, Vol.J75-B-II, No. 7, pp. 415–423, July 1992). Moreover, the QT-LMS algorithm (see IEICE, A, Vol.J72-A, No. 7, pp. 1038–1044, July 1989) performs a similar operation to this simplified algorithm, and can be applied instead of the simplified algorithm.

The foregoing explanations have assumed that N=1, but analogous explanations can be given when N>1, by changing:

$$C^H_{ext}(i) = [0 \; y_1(i) \; 0 \; y_2(i)] \tag{10}$$

to:

$$C^H_{ext}(i) = \left[ \overbrace{0 \ldots 0}^{N} y_1(i) \overbrace{0 \ldots 0}^{N} y_2(i) \right] \tag{11}$$

$$\underbrace{\quad}_{2(N+1)^{th} \text{ dimensional vector}}$$

and changing:

$$X^H_{ext}(i) = [w_1^{(1)*}(i) \; w_1^*(i) \; w_2^{(1)*}(i) \; w_2^*(i)] \tag{12}$$

to:

$$X^H_{ext}(i) = [W_1^{(N)*}(i) \; W_1^{(N-1)*}(i) \ldots$$
$$W_1^*(i) \; W_2^{(N-1)*}(i) \; W_1^{(N-1)*}(i) \ldots W_2^*(i)] \tag{13}$$

$$\underbrace{\quad}_{2(N+1)^{th} \text{ dimensional vector}}$$

and changing:

$$(\Phi)_{KL} = \begin{cases} 1, & K = L \\ 1, & K = 2m, L = 2m-1, \text{ where } m \text{ is a natural number} \\ 0, & \text{otherwise} \end{cases} \tag{14}$$

to:

$$\Phi = \left[ \begin{array}{c|c} \Phi_0 & 0_N \\ \hline 0_N & \Phi_0 \end{array} \right] : 2(N+1) \times 2(N+1) \text{ matrix} \tag{15a}$$

$0_N$: $(N+1) \times 2(N+1)$ zero matrix

-continued $$\Phi_0 = \begin{bmatrix} (0!)^{-1} & 0 & \cdots & 0 \\ (1!)^{-1} & (1!)^{-1} & \cdots & 0 \\ \vdots & & & \\ \{N!\}^{-1} & \{(N-1)!\}^{-1} & \cdots & 0! \end{bmatrix} : (N+1) \times (N+1) \text{ matrix} \quad (15b)$$

$$(\Phi_0)_{k,l} = \begin{cases} [(k-l)!]^{-1} & k \geq l \\ 0 & k < l \end{cases} \quad (15c)$$

Next, two-branch diversity using the structure of the second embodiment of this invention will be explained with reference to FIG. 4, which shows said two-branch diversity. The signal received from the first diversity branch, i.e., from a first antenna, is inputted from input terminal 1. This received signal has been spread using a PN sequence as the spreading code, and to demodulate it, it has to be despread using the same spreading code. Multiplier 2 multiplies the received signal by the PN sequence that is outputted by PN sequence generator 5, and feeds the result to integrating circuit 6. This operation is equivalent to despreading. The PN sequence has a sharp autocorrelation, and the signal cannot be extracted if the timings of the PN sequences used in transmitting and receiving do not coincide. Assuming that the timing of the PN sequence that is outputted by PN sequence generator 5 coincides with that of the PN sequence of the first arrival path, the signal component corresponding to the first arrival path will be extracted from integrating circuit 6 and outputted as a despread signal.

Likewise, multiplier 3 multiplies the received signal by the delayed PN sequence that is outputted from delay circuit 4, and feeds the result to integrating circuit 7. This operation is equivalent to despreading. On the assumption that the timing of the delayed PN sequence coincides with that of the PN sequence of the delayed arrival path, the signal component of the delayed arrival path will be extracted from integrating circuit 7' and outputted as a despread signal. Meanwhile, the signal received from the second diversity branch, i.e., from a second antenna, is inputted from input terminal 1'. Multiplier 2' multiplies the received signal by the PN sequence that is outputted from PN sequence generator 5 and feeds the result to integrating circuit 6'. This operation is equivalent to despreading. Assuming that the timing of the PN sequence that is outputted by PN sequence generator 5 coincides with that of the PN sequence of the first arrival path, the signal component of the first arrival path will be extracted from integrating circuit 6' and outputted as a despread signal.

Likewise, multiplier 3' multiplies the received signal by the delayed PN sequence that is outputted from delay circuit 4' and feeds the result to integrating circuit 7'. This operation is equivalent to despreading. Assuming that the timing of the delayed PN sequence coincides with that of the PN sequence of the delayed arrival path, the signal component corresponding to the delayed arrival path will be extracted from integrating circuit 7' and outputted as a despread signal. Here, multipliers 2, 3, 2' and 3', delay circuits 4 and 4', PN sequence generator 5, and integrating circuits 6, 6', 7 and 7' correspond to the despreading and receiving means.

The despread signals are respectively multiplied by tap coefficients in multipliers 8, 9, 8' and 9', and the results are added together by adder 72. The added signal outputted by adder 72 is fed to decision circuit 11. Decision circuit 11 is equivalent to the signal decision means, and after performing signal decision, outputs the decision signal corresponding to the desired signal from output terminal 12. Subtraction circuit 14 calculates and outputs the difference between this decision signal and the added signal, i.e., the a priori estimation error. When a known training signal is contained in the received signal, the training signal outputted from training signal memory 15 is used instead of the decision signal during the training signal interval. Switch circuit 13 performs this switching operation. Tap coefficient control circuit 16, which is equivalent to the tap coefficient estimation means, receives as input the a priori estimation error that is outputted by subtraction circuit 14, and the despread signals, and outputs the aforementioned tap coefficients. Better error rate performance can be obtained than when no diversity reception is employed.

Third embodiment

A third embodiment of this invention will now be explained. In this third embodiment, the tap coefficient control circuit shown in FIG. 3 in connection with the second embodiment of the invention is used as the frequency hopping receiver illustrated in FIG. 10.

As shown in FIG. 10, this invention is a spread spectrum receiver which has multipliers 28 and 31, low-pass filters 30 and 33, and timing adjustment circuits 55 and 56, which together serve as a despreading and receiving means. The despreading and receiving means separates the received spread spectrum signal, in which desired and interference signals are superimposed, into modulation signals corresponding to the different carriers, and outputs these as a plurality of despread signals. Estimated despread signal generators 300, shown in FIG. 11, serve as means to which are fed signal sequence candidates for the desired and interference signals, and generate estimated despread signals corresponding to these. Subtracters 122 serve as means which respectively subtract these estimated despread signals from the despread signals. Squaring circuits 123 which serve as means which respectively square the results of these subtractions. Adder 72 which serves as a means which adds the respective outputs of these squaring circuits 123 maximum likelihood sequence estimation circuit 210 serves as a signal decision means which performs signal decision by using the output of this adder 72, and outputs the decision signal corresponding to the desired signal, and the signal sequence candidates for the desired and interference signals.

Furthermore, according to this invention, estimated despread signal generator 300 has complex multipliers 127 and 128 and adder 73 shown in FIG. 11, which together serve as a means which generates estimated despread signals by respectively multiplying the signal sequence candidates for the desired and interference signals by tap coefficients and linearly combining the results. Tap coefficient control circuit 60 are fed these signal sequence candidates and the a priori estimation error which is the output of subtracter 122, and estimates the aforementioned tap coefficients.

The distinguishing feature of this invention is that tap coefficient control circuit 60 has transition matrix memory 50 which holds in advance a transition matrix which updates, as the tap coefficients, values that include the Nth order differentials of these coefficients, and matrix multiplication circuit 51 which multiplies by this transition matrix in the course of the least mean square computation. The operation of tap coefficient control circuit 60 is similar to the operation of tap coefficient control circuit 16 which was described in connection with the second embodiment of this invention. However, in Eqs. 5, 9c and 11, $y_1(i)$ has to be replaced by $\alpha_1(i)$, the signal candidate for the desired signal at time i, and $y_1(i)$ has to be replaced by $\alpha_1(i)$ the signal candidate for the interference signal at time i, and d(i) in Eq. 8b and 9a has to be replaced by the despread signal.

Next, an example of two-branch diversity based on this third embodiment of the invention will be explained with reference to FIG. 5, which shows the structure of said two-branch diversity in which the carrier frequency of the received signal is assumed to hop between f1 and f2. The signal received from the first diversity branch, i.e., from a first antenna, is inputted from input terminal 1.

In a frequency hopping system, the same frequency band is used by stations with different hopping patterns. This received signal will therefore comprise, in superposition, the desired signal in which the carrier frequency is hopped in a fixed pattern, and an interference signal in which the carrier frequency is hopped in different patterns.

In order to demodulate the desired signal, the received signal has to be down-converted, i.e., despread, using a carrier the frequency of which is hopped in the same pattern as the desired signal. Multiplier 28 multiplies the received signal by a carrier with frequency f1 which is intermittently outputted by carrier generator 29, and feeds the result to low-pass filter 30. This operation is equivalent to despreading. Assuming that the timing of the carrier with frequency f1 which is outputted by carrier generator 29 coincides with that of the modulated carrier with frequency f1 which is contained in the received signal, the modulation signal corresponding to carrier frequency f1 will be extracted from low-pass filter 30 and outputted as a despread signal.

Likewise, multiplier 31 multiplies the received signal by a carrier with frequency f2 which is intermittently outputted by carrier generator 32, and feeds the result to low-pass filter 33. This operation is equivalent to despreading. Assuming that the timing of the carrier with frequency f2 which is outputted by carrier generator 32 coincides with that of the modulated carrier with frequency f2 contained in the received signal, the modulation signal corresponding to carrier frequency f2 will be extracted from low-pass filter 33 and outputted as a despread signal. Branch metric computing circuits 201 and 202 receive as input the respective timing-adjusted despread signals that have been delayed by timing adjustment circuits 55 and 56, and the signal sequence candidates for the desired and the interference signals which are outputted by maximum likelihood sequence estimation circuit 210, and output the square of the a priori estimation error.

Meanwhile, the signal received from the second diversity branch, i.e., from a second antenna, is inputted from input terminal 1'. Multiplier 28' multiplies the received signal by a carrier with frequency f1 which is intermittently outputted by carrier generator 29, and feeds the result to low-pass filter 30'. This operation is equivalent to despreading. Assuming that the timing of the carrier with frequency f1 that is outputted by carrier generator 29 coincides with that of the modulated carrier with frequency f1 contained in the received signal, the modulating signal corresponding to carrier frequency f1 will be extracted from low-pass filter 30' and outputted as a despread signal.

Likewise, multiplier 31' multiplies the received signal by a carrier with frequency f2 which is intermittently outputted by carrier generator 32, and feeds the result to low-pass filter 33'. This operation is equivalent to despreading. Assuming that the timing of the carrier with frequency f2 that is outputted by carrier generator 32 coincidences with the modulated carrier with frequency f2 contained in the received signal, the modulation signal corresponding to carrier frequency f2 will be extracted from low-pass filter 33' and outputted as a despread signal. Here, multipliers 28, 28', 31 and 31', carrier generators 29 and 32, and low-pass filters 30, 30', 33 and 33' correspond to the despreading and detection means. Branch metric computing circuits 201' and 202' receive as input the respective timing-adjusted despread signals that have been delayed by timing adjustment circuits 55' and 56', and the signal sequence candidates for the desired and the interference signals which are outputted by maximum likelihood sequence estimation circuit 210, and output the square of the a priori estimation error.

Adder 72 computes the sum of the squares of the a priori estimation errors that are outputted by branch metric computing circuits 201, 202, 201' and 202', and feeds the result to maximum likelihood sequence estimation circuit 210. The result of multiplying this sum of the squares of the a priori estimation errors by a negative constant is equivalent to likelihood information for the signal sequence candidates, i.e., to the branch metrics. Maximum likelihood sequence estimation circuit 210 performs signal decision by means of maximum likelihood estimation based on the square sum of the a priori estimation errors. In other words, the cumulative sum of the branch metrics is calculated as a logarithmic likelihood function, the signal sequence candidate for which this logarithmic likelihood function becomes maximum is estimated, and the decision signal for the desired signal is outputted from output terminal 12. Here, maximum likelihood sequence estimation circuit 210 is equivalent to the signal decision means. Because diversity reception is employed, better error rate performance can be achieved than when diversity reception is not employed.

Fourth embodiment

Next, a fourth embodiment of this invention will be explained. This fourth embodiment is an example of the use of the tap coefficient control circuit illustrated in FIG. 3 in connection with the second embodiment including in the spread spectrum receiver shown in FIG. 9. An example of two-branch diversity based on this fourth embodiment of the invention will be explained with reference to FIG. 6, and it is assumed that the carrier frequency of the received signal hops between f1 and f2. The signal received from the first diversity branch, i.e., from a first antenna, is inputted from inputted terminal 1. The carrier frequency of this received signal is hopped in a fixed pattern, and to demodulate it, it has to be despread by using a carrier the frequency of which is hopped in the same pattern. Multiplier 28 multiplies the received signal by a carrier with frequency f1 which is intermittently outputted by carrier generator 29, and feeds the result to low-pass filter 30.

This operation is equivalent to despreading. Assuming that the timing of the carrier with frequency f1 which is outputted by carrier generator 29 coincides with that of the modulated carrier with frequency f1 which is contained in the received signal, the modulation signal corresponding to carrier with frequency f1 will be extracted from low-pass filter 30 and outputted as a despread signal.

Likewise, multiplier 31 multiplies the received signal by a carrier with frequency f2 which is intermittently outputted by carrier generator 32, and feeds the result to low-pass filter 33. This operation is equivalent to despreading. Assuming that the timing of the carrier with frequency f2 which is outputted by carrier generator 32 coincides with that of the modulated carrier with frequency f2 contained in the received signal, the modulation signal corresponding to carrier frequency f2 will be extracted from low-pass filter 33 and outputted as a despread signal.

Meanwhile, the signal received from the second diversity branch, i.e., from a second antenna, is inputted from input terminal 1'. Multiplier 28' multiplies the received signal by a carrier with frequency f1 which is intermittently outputted by carrier generator 29, and feeds the result to low-pass filter 30'. This operation is equivalent to despreading. Assuming that the timing of the carrier with frequency f1 that is outputted by carrier with generator 29 coincides with that of the modulated carrier with frequency f1 contained in the received signal, the modulating signal corresponding to carrier frequency f1 will be extracted from low-pass filter 30' and outputted as a despread signal.

Likewise, multiplier 31' multiplies the received signal by a carrier with frequency f2 which is intermittently outputted by carrier generator 32, and feeds the result to low-pass filter 33'. This operation is equivalent to despreading. Assuming that the timing of the carrier with frequency f2 that is outputted by carrier generator 32 coincides with that of the modulated carrier of frequency f2 contained in the received signal, the modulation signal corresponding to carrier frequency f2 will be extracted from lowpass filter 33' and outputted as a despread signal. Here, multipliers 28, 28', 31 and 31', carrier generators 29 and 32, and low-pass filters 30, 30', 33 and 33' correspond to the despreading and receiving means.

The timing-adjusted despread signals which have been delayed by timing adjustment circuits 55, 56, 55' and 56' are multiplied by tap coefficients in respective multipliers 34, 35, 34' and 35', and then added by adder 72. The added signal that is outputted by adder 72 is inputted to decision circuit 11. Decision circuit 11 is equivalent to the signal decision means and performs signal decision, and outputs the decision signal for the desired signal from output terminal 12. Subtraction circuit 14 calculates and outputs the difference between this decision signal and the added signal, i.e., the a priori estimation error. Note, that when a known training signal is contained in the received signal, the training signal outputted from training signal memory 15 is used instead of the decision signal during the training signal interval. Switch circuit 13 performs this switching operation. Tap coefficient control circuit 40, which is equivalent to the tap coefficient estimation means, receives as input the a priori estimation error outputted by subtraction circuit 14, and the despread signals, and outputs the tap coefficients. Better bit error rate performance can be obtained than when no diversity reception is employed.

We claim:

1. A spread spectrum receiver comprising:

despreading and receiving means which, for each path, despreads a received spread spectrum signal in which desired and interfering waves are superimposed, and which outputs the results as despread signals;

means which outputs a decision signal for the desired signal;

means to which are fed signal sequence candidates for the desired and interfering signals, and which generate corresponding estimated despread signals;

means which respectively subtract the estimated despread signals from the despread signals output from the despreading and receiving means for each path;

means which respectively square the results of the respective subtractions; and means which adds the respective outputs of the squaring means;

wherein the means which outputs a decision signal comprises a signal decision means which performs signal decision by using the output of the adding means, and which outputs the decision signal for the desired signals and the signal sequence candidates for the desired and interference signals.

2. A spread spectrum receiver as set forth in claim 1, wherein the means which generate estimated despread signals comprise a means which generates estimated despread signals by respectively multiplying the signal sequence candidates for the desired and interference signals by tap coefficients and linearly combining the results of the multiplications; and a tap coefficient control circuit to which are fed the signal sequence candidates and the output of the subtracting means, and which estimates the tap coefficients.

3. A spread spectrum receiver as set forth in claim 2, wherein the tap coefficient control circuit comprises:

a memory which holds in advance a transition matrix which updates, as the tap coefficients, values that include the Nth order differentials of coefficients (where N is a natural number); and a matrix multiplication circuit which multiplies by this transition matrix in the course of the least mean square computation.

4. A spread spectrum receiver as set forth in claim 3, wherein the transition matrix is:

$$(\Phi)_{K,L} = \begin{cases} 1, & K = L \\ 1, & K = 2m, L = 2m-1, \text{ where } m \text{ is a natural number} \\ 0, & \text{otherwise} \end{cases}$$

where K is the row number and L is the column number.

5. A spread spectrum receiver as set forth in claim 1, wherein the despreading and receiving means comprises a means which, for each path, respectively despreads signals received from a plurality of antennas, and outputs despread signals; and wherein the subtraction means has means which subtract the estimated despread signal from the despread signal for each of the antennas or paths.

6. A spread spectrum receiver comprising:

despreading and receiving means which despreads, for each path, the received spread spectrum signal and outputs despread signals;

means which respectively multiply the despread signals by tap coefficients;

means which adds the respective outputs of the multiplication means;

signal decision means to which is fed the output of the adding means, and which performs signal decision and outputs the decision signal;

a subtraction circuit which computes the difference between the output of the adding means and the decision signal; and a tap coefficient control circuit to which is fed the difference between the output of the adding means and the decision signal, and the despread signals, and which estimates the tap coefficients by means of least mean square computation;

wherein the tap coefficient control circuit comprises a memory which holds in advance a transition matrix which updates, as the tap coefficients, values that include the Nth order differentials of the coefficients (where N is a natural number); and a matrix multiplication circuit which multiplies by this transition matrix in the course of the least mean square computation.

7. A spread spectrum receiver as set forth in claim 6, wherein the transition matrix is:

$$(\Phi)_{K,L} = \begin{cases} 1, & K = L \\ 1, & K = 2m, L = 2m - 1, \text{ where } m \text{ is a natural number} \\ 0, & \text{otherwise} \end{cases}$$

where K is the row number and L is the column number.

8. A spread spectrum receiver as set forth in claim 6, wherein the despreading and receiving means comprises a means which, for each path, respectively despreads signals received from a plurality of antennas, and outputs despread signals.

9. A spread spectrum frequency hopping receiver comprising:

despreading and receiving means which separates a received spread spectrum signal in which desired and interference signals are superimposed, into modulation signals corresponding to different carriers, and which outputs a plurality of despread signals;

means to which are fed signal sequence candidates for the desired and interference signals and which generate corresponding estimated despread signals;

means which, for each despread signal, subtract the estimated despread signal from said despread signal output from the despreading and receiving means;

means which respectively square the results of the respective subtractions;

means which adds the respective outputs of the squaring means; and signal decision means which performs signal decision by using the output of the adding means, and which outputs the decision signal for the desired signal and the signal sequence candidates for the desired and interference signals;

wherein the means which generates estimated despread signals comprises:
means which generates the estimated despread signals by respectively multiplying the signal sequence candidates for the desired and interference signals by tap coefficients and linearly combining the results of the multiplications; and a tap coefficient control circuit to which is fed the signal sequence candidates and the output of the subtraction means, and which estimates the tap coefficients;

and wherein the tap coefficient control circuit comprises
a memory which holds in advance a transition matrix which updates, as the tap coefficients, values that include the Nth order differentials of the coefficients (where N is a natural number); and a matrix multiplication circuit which multiplies by this transition matrix in the course of the least mean square computation.

10. A spread spectrum receiver as set forth in claim 9, wherein the transition matrix is:

$$(\Phi)_{K,L} = \begin{cases} 1, & K = L \\ 1, & K = 2m, L = 2m - 1, \text{ where } m \text{ is a natural number} \\ 0, & \text{otherwise} \end{cases}$$

where K is the row number and L is the column number.

11. A spread spectrum receiver as set forth in claim 9, wherein the despreading and receiving means comprises a means which separates signals received from a plurality of antennas into modulation signals corresponding to different carriers, and outputs a plurality of despread signals.

12. A spread spectrum frequency hopping receiver comprising:

despreading and receiving means which despreads a received spread spectrum signal into respective modulation signals corresponding to different carriers and outputs despread signals;

means which respectively multiply the despread signals by tap coefficients;

means which adds the respective outputs of the multiplication means;

signal decision means to which is fed the output of the adding means, and which performs signal decision and outputs decision signals;

a subtraction circuit which computes the difference between the output of the adding means and the decision signals;

and tap coefficient control circuit to which is fed the difference and the despread signals, and which estimates the tap coefficients by means of least mean square computation;

wherein the tap coefficient control circuit comprises a memory which holds in advance a transition matrix which updates, as the tap coefficients, values that include the Nth order differentials of the coefficients (where N is a natural number); and a matrix multiplication circuit which multiplies by the transition matrix in the course of the least mean square computation.

13. A spread spectrum receiver as set forth in claim 12, wherein the transition matrix is:

$$(\Phi)_{K,L} = \begin{cases} 1, & K = L \\ 1, & K = 2m, L = 2m - 1, \text{ where } m \text{ is a natural number} \\ 0, & \text{otherwise} \end{cases}$$

where K is the row number and L is the column number.

14. A spread spectrum receiver as set forth in claim 12, wherein the despreading and receiving means comprises a means which respectively despreads signals received from a plurality of antennas into modulation signals corresponding to different carriers.

* * * * *